United States Patent Office 2,925,342
Patented Feb. 16, 1960

2,925,342

OLEANDOMYCIN ANTIBIOTIC IN FEED

William C. Sherman, Gerald A. Donovan, Warren M. Reynolds, and Herbert G. Luther, Terre Haute, Ind., assignors to Chas. Pfizer & Co., Inc., New York, N.Y., a corporation of Delaware No Drawing. Application September 30, 1957
Serial No. 686,851

6 Claims. (Cl. 99—2)

This invention relates to improved animal feeds as well as to a new method for markedly improving the growth of animals, particularly poultry. It is especially concerned with nutritionally balanced animal feed compositions containing an oleandomycin antibiotic compound.

In the past, it has been reported that various antibiotics are useful for stimulating the growth of domestic animals, particularly poultry and swine. The exact mechanism of this phenomenon is not understood, but the process has proven to be of sufficient value so that certain antibotics are widely used for agricultural purposes. Among the more active antibiotics for use in stimulating the growth of poultry is penicillin, which is marketed in such forms as procaine penicillin or dibenzylethylenediamine penicilline. It has been observed in recent years that the degree of response of poultry to penicillin is not as favorable now as it was when much of the work in this field was originally done; that is, the rate of growth of, for instance, chicks, on a nutritious diet containing what is normally considered to be an adequate level of penicillin is not as great when compared to the same type of animals fed on the same type diet without the pencillin as was encountered five years or more ago. It has been speculated that this is due not to a failure of the penicillin to have an effect on the animals growth, but rather that the effect is due to the absence in the environment of the control animals of microorganisms which, to some extent, suppress the full growth of these animals. This may be due to a greater practice of sanitary techniques in recent years and also to the continued use of antibiotic products in animal feeds.

It has now been found that animal feeds containing nutritional levels of the antibiotic, oleandomycin, elicit a substantially greater growth increase and feed efficiency response than any other antibiotic now available and substantially greater than the response elicited by penicillin which, as indicated above, is considered to be one of the best of the antibiotics for use in poultry. Oleandomycin is a commercially available antibiotic, the production and properties of which are described and claimed in U.S. Patent No. 2,757,123 by B. A. Sobin et. al. The true nature of the herein described activity, i.e., the fact that oleandomycin should bring about an appreciably greater rate of growth in poultry than does, for instance, penicillin, is not understood. It seems clear that the effect is not due to the activity of the antibiotic on microorganisms in the animal system which may have become resistant to penicillin.

The comparatively greater activity of oleandomycin as compared with other antibiotics when used in nutritionally balanced animal feeds may be seen when it is noted that a level of as low as one gram per ton of feed elicits a response substantially greater than the use of as much as four times that quantity of pencillin. In general, oleandomycin may be used in animal feeds at a concentration level of from about 1.0 gram to about 40 grams per ton to obtain the unusually high degree of response in growth promotion. The use of larger amounts has no particular value in animal growth stimulation. However, if a diseased condition is encountered or anticipated in the animals in question, the level may be substantially increased with subsequent control of the infection if it is due to an oleandomycin-sensitive strain of microorganism. Although some effect may be obtained by less than 1.0 gram per ton of feed, it may be variable, and it is advisable not to use appreciably lesser amounts. The preferred proportion is from about one gram to about five grams of oleandomycin antibiotic compound per ton of feed.

The herein described feeds of this invention have been found to be particularly valuable and outstanding in the case of non-ruminant animals, such as chickens, turkeys, ducks, hogs, and the like. The oleandomycin may, of course, be administered in one component of the feed or it may be blended uniformly throughout a mixed feed. Alternatively, it may be administered in an equivalent amount via the animal's water ration or other fluids. A variety of feed components may be of use in the nutritional diets. A type of conventional feed material in the case of poultry, which is often preferred in the operation of this invention, is one which follows generally the suggested formulae set forth on page six of the authoritative pamphlet issued by the National Research Council (Washington, D.C., June 1944), and entitled "Recommended Nutrient Allowances for Poultry." For instance, feed compositions are recommended to contain roughly between 50% and 80% of grains, between 3% and 10% of animal protein, between 5% and 30% of vegetable protein, between 2% and 4% of minerals, together with supplementary vitaminaceous sources.

When reference is made to oleandomycin herein, this term is intended to include not only the basic compound itself, but also the oleandomycin-chloroform adduct as well as various nontoxic, pharmacologically acceptable acid addition salts, such as the hydrochloride, sulfate, phosphate, hydrobromide, acetate, citrate and tartrate, etc. It is also intended to include within this term various biologically active derivatives of oleandomycin, such as the lower polyacyl esters of oleandomycin having from two to four carbon atoms in the acyl moiety. The process for the production of tri-lower acyl esters comprises contacting oleandomycin with the corresponding acyl anhydride. This reaction is preferably conducted in the presence of a basic catalyst and an excess of the acylating agent is usually employed for optimum results. The process can be suitably conducted at a temperature in the range of from about 0° to about 50° C. for a time period of from about five to about 48 hours. Furthermore, oleandomycin may be used in animal feeds in conjunction with various other antibiotics or therapeutic agents such as penicillin, oxytetracycline, tetracycline, chlortetracycline, bacitracin, sulfaquinoxaline, phenylarsonic acid, etc.

In accordance with a preferred embodiment of this invention, it has been found that in chick battery trials of four weeks' duration, the addition of oleandomycin to the feed at levels of one to five grams per ton afforded growth and feed efficiency responses that were two to three times the magnitude obtained with procaine penicillin. In particular, the weight of the chicks is increased by about 7–10% and the feed efficiency is improved by about 1–3%; comparable levels of penicillin increase the weight by only 0–1% and improve the feed efficiency only by 0–2%. Furthermore, these responses to oleandomycin concentration levels in the range of four to five grams per ton are as great as those obtained with higher concentration levels of the same antibiotic.

This invention is further illustrated by the following examples, which are not to be considered as imposing any limitation on the scope thereof.

Example I

The growth experiments with oleandomycin were conducted on Nichols white-cross chicks kept in electrically heated brooders on raised wire floors. The day old chicks were divided into lots of five males and five females per compartment, replicated twice per treatment. The basal diet employed is shown below in the following table:

| Ingredients | Diet (lbs.) |
|---|---|
| Ground Yellow Corn | 56.44 |
| 44% Solvated Soybean Meal | 26.94 |
| Corn Gluten Meal | 2.50 |
| Alfalfa Meal | 2.00 |
| Stabilized Animal Fat | 1.50 |
| Fish Meal | 4.00 |
| Dried Corn Distillers Solubles | 1.00 |
| Dried Whey (50% delactosed) | 1.00 |
| Dried Brewers Yeast | 1.50 |
| Iodized Salt | 0.40 |
| Calcium Carbonate | 1.30 |
| Calcium Phosphate, Dibasic | 1.00 |
| Delamix | 0.10 |
| DL-Methionine | 0.01 |
| Vitamin A (10,000 I.U./g.) | 0.05 |
| Vitamin $B_{12}$ | 0.020 |
| Vitamin $D_3$ (1,500 I.C.U./g.) | 0.05 |
| Riboflavin | 0.05 |
| DL-Calcium Pantothenate | 0.001 |
| Niacin | 0.001 |
| Choline Chloride 25% | 0.125 |
| N,N'-Diphenyl-phenylenediamine | 0.0125 |
| | 100 |

The antibiotic test materials were added to the diet in premix form at the expense of yellow corn meal. Birds were individually weighed and records of feed consumption by lot were maintained. Four week chick weights were subjected to statistical analysis for significance by the method of analytical variance. The results obtained are presented in the following table:

| Treatment | Antibiotic, grams/ton | Av. Weight (Grams) 2 weeks | Mortality, Percent |
|---|---|---|---|
| None | 0 | 144 | 0 |
| Oleandomycin base | 4 | 151 | 0 |
| Do | 40 | 154 | 0 |

The above experiment was conducted on two replicates of 10 chicks per treatment with both four grams and 40 grams of oleandomycin per ton of feed for a period of two weeks.

When New Hampshire Red chicks were treated in a similar manner, the results obtained were substantially the same.

Example II

The same procedure as described in Example I was followed here except that it was of four weeks duration with four replicates per treatment. The results obtained are reported in the following table:

| Treatment | Antibiotic, grams/ton | Av. Weight (grams) 2 weeks | Av. Weight (grams) 4 weeks | Feed Efficiency (Lbs. Feed/Lbs. Gain) 4 weeks | Mortality, Percent |
|---|---|---|---|---|---|
| None | | 161 | 364 | 1.98 | 0 |
| Procaine Penicillin | 4 | 159 | 358 | 2.01 | 0 |
| Do | 400 | 177 | 379 | 1.97 | 0 |
| Oleandomycin base | 4 | 175 | 400 | 1.96 | 0 |
| Do | 40 | 174 | 380 | 1.99 | 0 |
| Do | 400 | 169 | 374 | 1.97 | 5 |

As illustrated above, it was found that the inclusion of four grams of procaine penicillin per ton produced no improvement in growth or feed efficiency, but 400 grams of procaine penicillin per ton of feed produced a small growth response. However, with oleandomycin at four grams per ton, growth and feed efficiency were improved over that of the negative control group or the penicillin group. The addition of higher level of oleandomycin (40 to 400 grams per ton) did not produce an improvement over results obtained with four grams of this antibiotic.

Example III

The same procedure as described in Example II was followed here except that the concentration levels of procaine penicillin and oleandomycin employed were different. The results obtained are presented in the following table:

| Treatment | Antibiotic, grams/ton | Av. Weight (grams) 2 weeks | Av. Weight (grams) 4 weeks | Feed Efficiency (Lbs. Feed/Lbs. Gain) 4 weeks | Mortality, Percent |
|---|---|---|---|---|---|
| None | | 170 | 425 | 1.64 | 2.5 |
| Procaine Penicillin | 5 | 175 | 431 | 1.61 | 2.5 |
| Do | 25 | 178 | 440 | 1.61 | 0 |
| Oleandomycin base | 5 | 185 | 455 | 1.60 | 0 |
| Do | 25 | 188 | 461 | 1.60 | 2.5 |

As illustrated above, it was found that the inclusion of procaine penicillin at the rate of five or 25 grams per ton produced only slight, nonsignificant improvements in growth and feed efficiency. However, equal levels of oleandomycin produced growth responses of approximately three times the magnitude obtained with procaine penicillin. The superiority of the growth with oleandomycin over that with procaine penicillin was statistically significant.

Example IV

A similar experiment, again conducted with a nutritionally balanced basal ratio but utilizing lower concentration levels of oleandomycin, was carried out for a period of four weeks with the following results:

| Treatment | Antibiotic, grams/ton | Av. Weight (grams) 4 weeks |
|---|---|---|
| None | 0 | 503 |
| Procaine Penicillin | 1 | 521 |
| Do | 2 | 516 |
| Do | 4 | 525 |
| Oleandomycin base | 1 | 565 |
| Do | 2 | 555 |
| Do | 4 | 580 |

Example V

Maryland Medium White turkey poults were treated in the manner of the previous examples with a nutritionally-balanced diet containing oleandomycin at a concentration level of 30 grams per ton of feed. The basal diet employed is presented in the following table:

| Ingredients | Diet (lbs.) |
|---|---|
| Fine Ground Yellow Corn | 56.48 |
| 44% Solvated Soybean Meal | 26.94 |
| Corn Gluten Meal | 2.50 |
| Alfalfa Meal 17% Dehyd | 2.00 |
| Stabilized Animal Fat | 1.50 |
| Fish Meal | 4.00 |
| Dried Corn Distillers' Solubles | 1.00 |
| Dried Whey (50% delactosed) | 1.00 |
| Dried Brewers Yeast | 1.50 |
| Iodized Salt | 0.40 |
| Calcium Carbonate | 1.30 |
| Calcium Phosphate | 1.00 |
| Delamix | 0.10 |
| DL-Methionine | 0.01 |
| Vitamin A (10,000 I.U./g.) | 0.05 |
| Vitamin $B_{12}$ | 0.025 |
| Vitamin $D_1$ (3,000 I.C.U./g.) | 0.025 |
| Riboflavin | 0.05 |
| DL-Calcium Pantothenate 45% | 0.001 |
| Niacin | 0.001 |
| Choline Chloride 25% | 0.125 |
| | 100 |

At the end of two weeks it was found that the average weight of the turkeys was about 32% higher than the average weight of the birds in the control group.

*Example VI*

When triacetyloleandomycin was used in place of oleandomycin base in each of the aforesaid examples, the results obtained were substantially the same. This was also the case when tripropionyloleandomycin and tributyryloleandomycin were similarly employed.

*Example VII*

When oleandomycin hydrochloride was used in each of the above examples, the results obtained were substantially the same as those afforded by oleandomycin base. In a similar manner, oleandomycin hydrobromide, oleandomycin hydriodide, oleandomycin phosphate, oleandomycin sulfate, oleandomycin acetate, oleandomycin citrate and oleandomycin tartrate were all individually employed in lieu of oleandomycin base; in each case, the results obtained were in substantial agreement with the data obtained in the previous examples.

Hence, this invention provides new and useful animal feeds containing oleandomycin antibiotics which afford a truly remarkable magnitude of growth responses in view of the difficulty usually encountered in obtaining antibiotic responses under battery conditions.

What is claimed is:

1. An animal feed composition comprising a nutritionally-balanced animal feed together with an oleandomycin antibiotic compound at a concentration level that is in the range of from about 1.0 gram to about 40 grams per ton of feed.

2. A feed composition as claimed in claim 1 wherein the oleandomycin antibiotic compound is oleandomycin base.

3. A feed composition as claimed in claim 1 wherein the oleandomycin antibiotic compound is a pharmacologically acceptable oleandomycin acid addition salt.

4. A feed composition as claimed in claim 1 wherein the oleandomycin antibiotic compound is a lower aliphatic polyacyl ester of oleandomycin having from two to four carbon atoms in the acyl moiety.

5. A process for increasing growth and improving feed efficiency in animals which comprises administering thereto a nutritionally-balanced feed composition containing from about 1.0 gram to about 40 grams proportion of an oleandomycin antibiotic compound per ton of feed composition.

6. A process for increasing growth and improving feed efficiency in non-ruminant animals, which process comprises feeding these animals on a nutritionally balanced feed compostion containing from about 1.0 gram to about 40 grams proportion of an oleandomycin antibiotic compound per ton of feed composition.

References Cited in the file of this patent

Braude et al.: Antibiotics & Chemotherapy, July 1953, vol. 3, pp. 271–285.

Sobin et al.: Antibiotic Annual, 1954–1955, pp. 827–830; Medical Encyclopedia Inc., N.Y.